United States Patent [19]

Hanaway

[11] 4,008,819
[45] Feb. 22, 1977

[54] SELF-RAISING BIN LOADING AUGER FOR COMBINES

[75] Inventor: Roger D. Hanaway, Blue Springs, Mo.

[73] Assignee: Allis-Chalmers Corporation, Milwaukee, Wis.

[22] Filed: Sept. 26, 1975

[21] Appl. No.: 617,097

[52] U.S. Cl. .............................. 214/522; 198/668; 214/83.32; 214/83.26; 214/17 C
[51] Int. Cl.² .......................................... B60P 1/40
[58] Field of Search ............... 214/522, 521, 83.26, 214/83.32, 17 C, 17 CA, 41, 15 R, 15 E; 198/36, 94, 99, 69, 674, 668, 548; 53/244; 141/284; 296/57 A

[56] References Cited

UNITED STATES PATENTS

| | | | |
|---|---|---|---|
| 1,886,295 | 11/1932 | Morris | 214/17 C |
| 2,557,001 | 6/1951 | Kohl | 198/69 X |
| 2,814,377 | 11/1957 | Jirak | 198/99 X |
| 3,097,460 | 7/1963 | O'Brien | 53/244 X |

FOREIGN PATENTS OR APPLICATIONS

510,464  8/1939  United Kingdom ............. 296/57 A

Primary Examiner—Albert J. Makay
Attorney, Agent, or Firm—Robert C. Sullivan

[57] ABSTRACT

A loading apparatus for the grain tank or bin of an agricultural combine. The grain tank or bin is located in the upper part of the combine, and, in the illustrated embodiment, the grain bin comprises a main grain bin and a grain bin extension mounted above the main grain bin. Clean grain which has been separated from the straw, chaff, or the like is conveyed by an elevating conveyor which discharges the grain via a chute into the intake end of an elongated pivotally mounted "floating" auger conveyor. When the level of the grain in the bin is below a predetermined level, the floating auger conveyor will assume a horizontal position contiguous the upper portion of the bin. The rotatable shaft of the floating auger conveyor is connected in driven relation to a suitable rotatable drive means through a universal drive joint as the grain level in the grain bin approaches a full condition, the floating auger conveyor moves angularly upwardly from the horizontal position due to the reaction of the discharging grain with the upper surface of the already loaded grain, the floating auger conveyor riding on the upper surface of the already loaded grain. An important feature of the construction is that the universal drive joint by means of which the floating auger shaft is connected to the rotatable driving means is located out of the path of grain flow to the intake end of the floating auger conveyor.

12 Claims, 6 Drawing Figures

SELF-RAISING BIN LOADING AUGER FOR COMBINES

BACKGROUND OF THE INVENTION

Field of the Invention

This invention relates to a loading apparatus for the grain tank of an agricultural combine, and to the combination of such a loading apparatus with the grain tank of an agricultural combine.

Related Patent Applications

The subject matter of this patent application is related to the subject matter of a United States patent application, Ser. No. 617,101, of J. Lyle Shaver entitled "Self-Raising Bin Loading Auger for Combines," filed in the United States Patent Office on Sept. 26, 1975, and assigned to the same assignee as the present application.

DESCRIPTION OF THE PRIOR ART

Agricultural combines used in the harvesting of grain crops conventionally include an elevated grain tank or bin in which the harvested crop is temporarily stored during the harvesting operation for discharge at appropriate intervals into attendant vehicles or receptacles. Combines having grain storage tanks or bins and conveyor arrangements for loading such grain storage tanks are shown, for example, by U.S. Pat. No. 3,152,702, issued to Herman G. Klemm et al on Oct. 13, 1964; U.S. Pat. No. 3,193,118, issued to Ralph L. Tweedale on July 6, 1965; and U.S. Pat. No. 3,503,533 issued to D. C. Bichel on Mar. 31, 1970.

The grain storage tank or bin on the combine is conventionally loaded by a clean grain elevator which collects the clean grain from the grain cleaning mechanism and elevates it to adjacent the top of the grain tank where the clean grain elevator delivers the clean grain to an additional conveyor means, usually of the auger type, which overlies the open upper end of the grain tank, the auger conveyor means discharging the grain at some intermediate point overlying the grain tank whereby to obtain substantially even loading and distribution of the grain into the grain storage tank. Such an arrangement is shown, for example, by the aforementioned U.S. Pat. No. 3,503,533.

In the prior art arrangements of which I am aware, including that shown by the aforementioned U.S. Pat. No. 3,503,533, the auger conveyor which receives the grain from the clean grain elevator contiguous the upper portion of the grain storage tank on the combine has a fixed position relative to the grain tank and extends either in a horizontal direction or at an angle inclined upwardly from the horizontal as in U.S. Pat. No. 3,503,533.

STATEMENT OF THE INVENTION

Accordingly, it is an object of the present invention to provide in conjunction with a grain storage tank or bin of an agricultural combine a grain distributing auger conveyor which receives clean grain from a clean grain elevator, and which is characterized by the fact that at least the discharge end of the bin loading auger conveyor floats or rides upon the upper surface of the piled-up grain within the storage tank or bin after the level of the grain reaches a predetermined level within the bin (approaching a full condition of the bin), the bin loading auger conveyor rising upwardly about a pivotal axis as the level of the grain in the grain bin approaches a fully loaded position, and in which the pivotally mounted bin loading auger conveyor is rotatably driven in any angular position which it may be required to assume relative to the horizontal plane through a universal or flexible drive joint which is positioned out of the path of grain flow to the auger conveyor. It is another object of the invention to provide for use in conjunction with the grain storage tank or bin of an agricultural combine a pivotally mounted bin loading auger conveyor which receives the grain to be loaded directly via a chute from the discharge end of the clean grain elevating conveyor.

It is still another object of the invention to provide for use in conjunction with a pivotally mounted auger conveyor used with the grain storage tank or bin of an agricultural combine, a universal drive joint or flexible joint through which the pivotally mounted auger conveyor is connected to the rotatable drive means, which universal drive joint or flexible joint is so positioned as to be out of the path of grain flow to the auger conveyor, whereby to provide a higher rate of grain flow, less grain damage and less power consumption.

In achievement of these objectives, there is provided in accordance with an embodiment of the invention an improved loading apparatus for the grain tank or bin of an agricultural combine. The grain tank or bin is located in the upper part of the combine, and, in the illustrated embodiment the grain bin comprises a main grain bin and a grain bin and a grain bin extension mounted above the main grain bin. Clean grain which has been separated from the straw, chaff or the like is conveyed by an elevating conveyor which discharges the grain via a chute into the intake end of an elongated pivotally mounted floating auger conveyor. When the level of the grain in the bin is below a predetermined level, the floating auger conveyor will assume a horizontal position contiguous the upper portion of the bin, but spaced below the upper end of the bin extension, and will also extend laterally inwardly to the bin from the general region of one longitudinal side of the bin and in overlying relation to the hollow interior of the bin, whereby the floating auger conveyor discharges into the bin at a substantially central location. The rotatable shaft of the floating auger conveyor is connected in driven relation to a suitable rotatable drive means through a universal drive joint, whereby the auger shaft of the pivotally mounted floating auger conveyor is rotatably driven at any angular position in a vertical plane which the pivotally mounted auger tube of the floating auger conveyor may be required to assume about its horizontal pivotal axis. As the grain level in the grain bin approaches a full condition, the floating auger conveyor moves angularly upwardly from a horizontal position due to the reaction of the discharging grain with the upper surface of the already loaded grain, at least the discharge end of the floating auger conveyor riding on the upper surface of the already loaded grain. A tension spring may also be used to exert an upward force on the floating auger conveyor, supplementing the aforementioned reaction force of the discharging grain. The use of a floating discharge auger conveyor at least the discharge end of which rides on the upper surface of the already loaded grain as the grain bin approaches a full condition minimizes grain damage and lowers power requirements as compared to a discharge auger conveyor the discharge end of which might become submerged in the already loaded grain, and also avoids excess height of the combine as compared to a fixed position discharge auger conveyor which is permanently located at the maximum height required, whereas the floating discharge auger conveyor only reaches its maximum height when the grain level in the bin reaches its maximum height. An important feature of the construction is that the universal drive joint be means of which the floating auger shaft is connected to the rotatable driving means is located out of the path of grain flow to the intake end of the floating auger conveyor, thereby permitting increased volume of grain flow to the floating auger conveyor, and reducing grain damage and power requirements as compared to a construction in which the universal drive joint is positioned in the path of grain flow to the floating auger conveyor.

BRIEF DESCRIPTION OF THE DRAWINGS

Further objects and advantages of the invention will become apparent from the following description taken in conjunction with the accompanying drawings, in which.

DESCRIPTION OF THE PREFERRED EMBODIMENT

Referring now to drawings, there is shown a grain tank or bin generally indicated at 10 which is adapted to be mounted in any suitable manner on the upper portion of an agricultural combine. In the illustrated embodiment, grain bin 10 comprises a main grain bin 10A and a grain bin extension 10B mounted above the main grain bin. The grain bin 10 is a large hollow storage tank and is normally provided with suitable means (not shown) contiguous the lower end thereof for discharging grain stored therein at appropriate intervals into attendant vehicles or receptacles.

Figure 4:
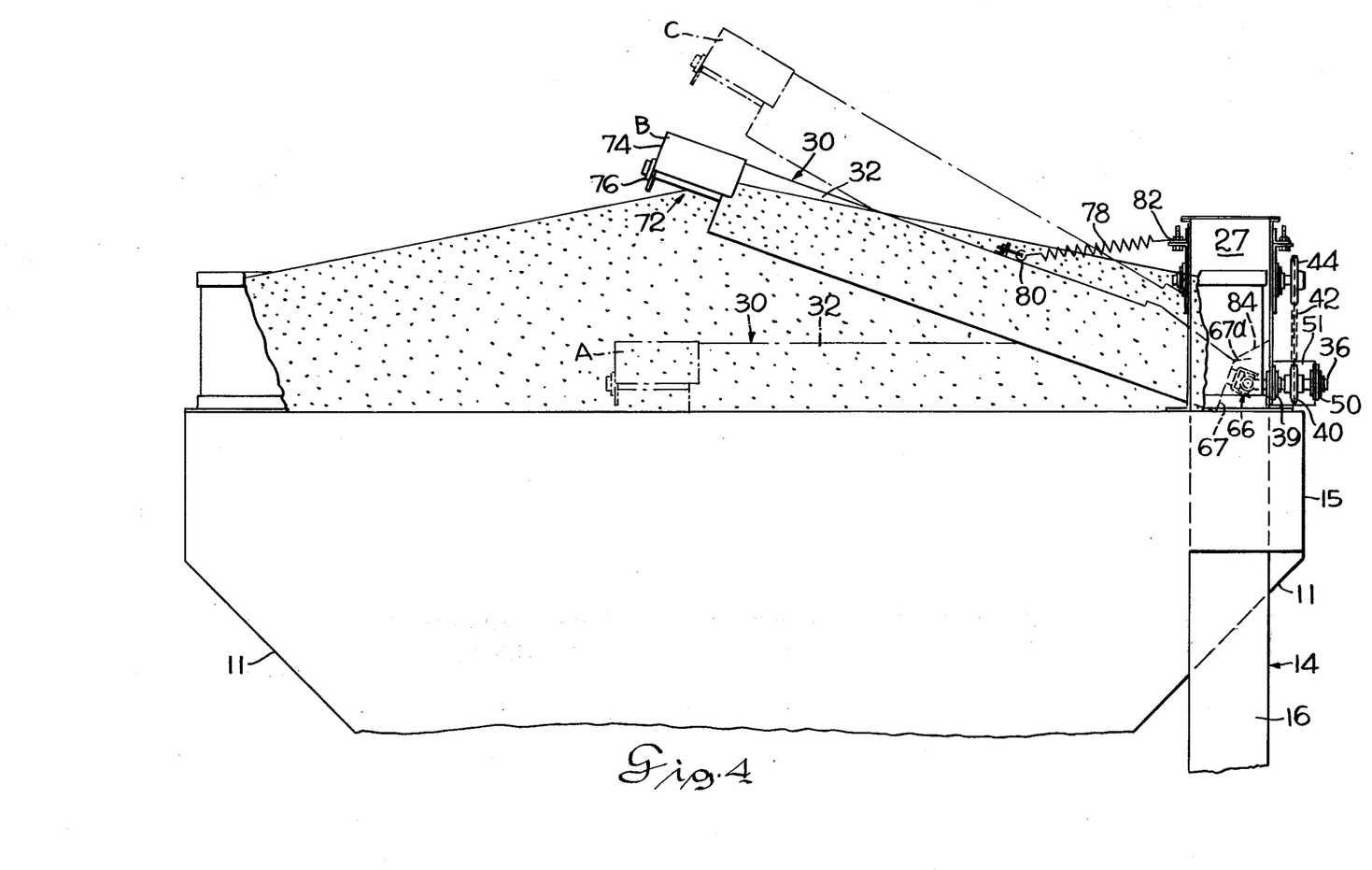
FIG. 4 is a partial end view with parts broken away showing the grain storage bin and associated floating grain distributing auger conveyor of FIGS. 1 and 2, the view being taken in a direction transversely of the longitudinal axis of the combine.

Opposite lateral sides of the lower portion of main grain bin 10A are inclined laterally inwardly and downwardly as indicated at 11 (FIG. 4). The right-hand side of main grain bin 10A as viewed in FIG. 4, is provided with a hollow overhang indicated at 15.

The combine on which grain bin 10 is mounted is provided with an appropriate grain separating mechanism, not shown, which separates the grain from the straw, chaff, or the like. The cleaned grain is deposited at a collecting station contiguous the lower portion of the combine structure, from whence the grain is delivered by an auger type conveyor, or the like, (not shown) to the lower end of a clean grain elevator generally indicated at 14. The clean grain elevator 14 comprises a closed housing 16, normally of rectangular cross-section within which the conveyor flights 24 of the grain elevator move, housing 16 extending upwardly at an inclination as viewed from one lateral (i.e., longitudinally extending) side of the conveyor. Clean grain elevator housing 16 passes upwardly at an inclination through grain bin overhang 15 and into a housing generally indicated at 27 (FIGS. 1 and 5) which projects into the grain bin extension 10B. Both housing 27 and grain bin extension 10B are suitably mounted on the upper end of main grain bin 10A. Grain bin extension 10B is slightly shorter in both longitudinal and transverse dimensions than main grain bin 10A. The upper and lower ends of grain bin extension 10B are open and the upper end of main grain bin 10A is open. Hence, when main grain bin 10A becomes full, the grain level then begins extending upwardly into grain bin extension 10B.

The function of housing 27 is to suitably enclose the upper end of clean grain elevator 14 and its housing 16, as well as to enclose grain chute 28 which delivers grain discharged by clean grain elevator 14 to a pivotally mounted auger conveyor generally indicated at 30, as will be explained in more detail hereinafter.

As will be explained in more detail hereinafter, auger tube 32 of auger conveyor 30 is suitably supported by contiguous stationary structure for pivotal movement in a vertical plane about a pivotal axis X—X (FIGS. 3 and 3a) which passes through or coincides with the pivot point or center of the universal connecting means such as universal joint 66 used to drivingly connect the horizontal drive shaft 36 to the rotatable auger shaft 38, both to be hereinafter described.

The clean grain elevator 14 includes a suitable chain 22 having conveyor flights 24 mounted thereon, flights 24 supporting the grain being elevated by clean grain elevator 14. A drive sprocket (not shown) which is driven by a suitable driving mechanism drivingly engages the lower end of chain 22. The upper end of chain 22 passes around an idler sprocket 26 which is suitably mounted on an idler shaft 46 at the opposite or upper end of grain elevator 14, whereby conveyor chain 22 carrying flights 24 may elevate the clean grain picked up at the lower end of the grain elevator 14 and carry it to the upper end of the grain elevator 14 at which point the clean grain is discharged through a suitable opening in housing 16 of the clean grain elevator into a vertical chute generally indicated at 28 which delivers the clean grain thus discharged from grain elevator 14 into the upwardly open end portion 34 of pivotally mounted auger tube 32 of a pivotally mounted or floating auger conveyor generally indicated at 30.

The opening in end portion 34 of auger tube 32 through which grain from chute 28 passes into the interior of auger tube 32 is bounded by wall surfaces indicated at 34a, 34b, 34c, 34d, which serve to guide and prevent spillage of the grain as it passes into the interior of auger tube 32.

A relatively short horizontal rotatable drive shaft 36 projects laterally through and outwardly beyond lateral side wall 29 of housing 27 and is provided with a driven sprocket 40 thereon driven through a chain 42 trained around a sprocket 44 mounted on idler shaft 46 on which idler sprocket 26 of clean grain elevator 14 is fixed. Thus, the horizontal drive shaft 36 is driven by idler shaft 46 through sprocket 44, chain 42, and sprocket 40 fixed to the outer end of drive shaft 36.

Drive shaft 36 is supported by a suitable bearing 39 where shaft 36 passes through wall 29 and into the interior of housing 27, drive shaft 36 extending for a short distance into the interior of housing 27 for connection to a universal drive connection such as universal joint 66, as will be described more fully hereinafter.

The outboard end (i.e., the right-hand end in FIGS. 2 and 4) of rotatable drive shaft 36 which lies laterally outwardly beyond housing 27 is supported by a suitable bearing 50 which is itself supported by a suitable bearing support 51 mounted on the lower outer portion of wall 29 of housing 27.

In accordance with an important feature of the construction, the pivotally movable or floating conveyor auger tube subassembly, generally indicated at 30, is provided and comprises an elongated cylindrical auger tube 32 which houses a rotatable grain feed auger generally indicated at 33. Grain feed auger 33 comprises a rotatable shaft 38 and a helical auger conveyor 41 which is fixed to rotatable auger shaft 38 and rotates therewith.

Figures 1, 3, 3A:
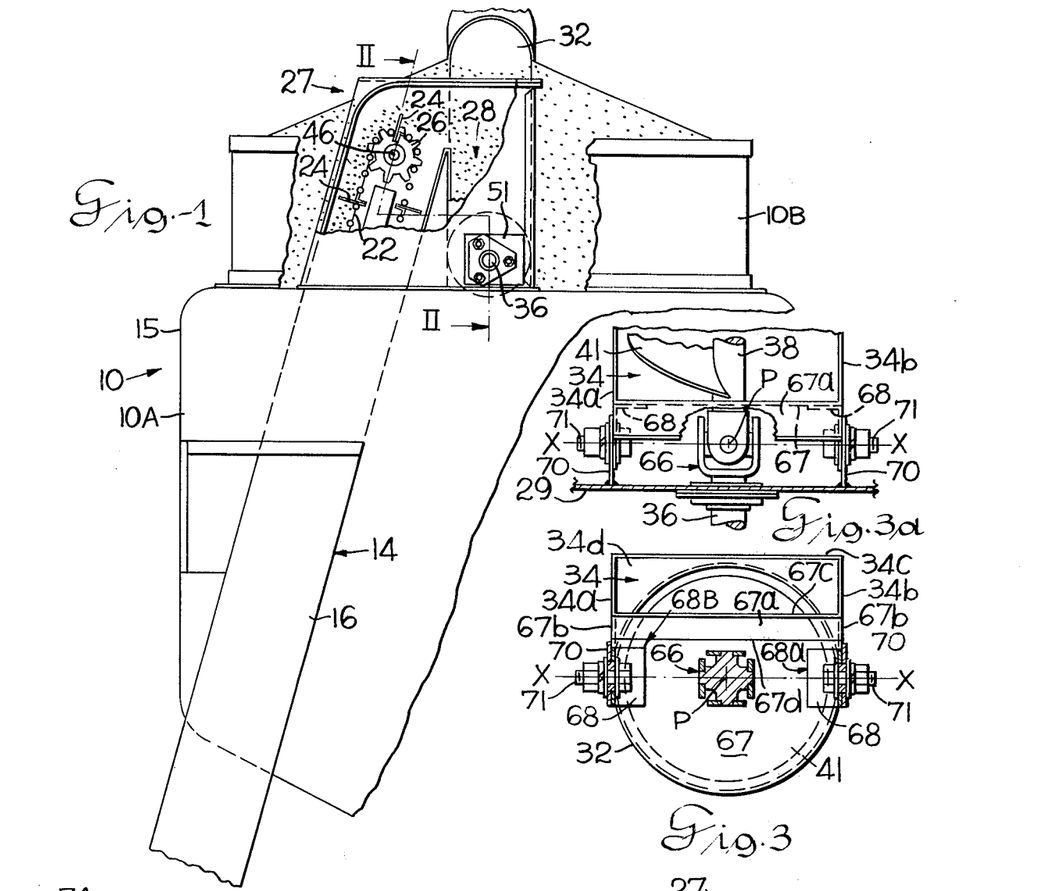
FIG. 1 is a view in side elevation, partially schematic, of a grain bin mounted on an agricultural combine, and showing a clean grain elevator which delivers clean grain to the input end of the grain distributing auger conveyor arrangement in accordance with the invention.
FIG. 3 is a view in transverse section along line III—III of FIG. 2 showing the pivotal support arrangement for the floating auger tube.
FIG. 3a is a top plan view of FIG. 3 partially in section showing the pivotal support arrangement for the floating auger tube.

When pivotally mounted auger conveyor 30 is in a horizontal position as indicated at "A" in FIG. 4, the under surface of auger tube 32 of auger conveyor 30 is located at a height substantially contiguous the level of the junction between main grain bin 10A and grain bin extension 10B and is substantially centrally located relative to the longitudinal dimension of main grain bin 10A (i.e., centrally of the left-to-right dimension of FIG. 1. A suitable stop member 52 is suitably secured to the inner surface of wall 29 of housing 27 in the path of movement of auger tube 32 and serves to prevent pivotally mounted auger tube 32 from dropping below the horizontal position indicated at A in FIG. 4. Auger tube 32 of pivotally movable auger conveyor 30 extends laterally inwardly from a location contiguous but spaced laterally inwardly from the right-hand lateral side wall 29 (as viewed in FIGS. 2 and 4) of housing 27, auger tube 32 projecting beyond the laterally inner boundary of chute 28 and into overlying relation to the hollow interior of the hollow space defined by main grain bin 10A and/or by grain bin extension 10B, as the case may be. As will be described more fully, the left-hand end (FIGS. 2, 4, 5) of auger tube 32 terminates in a grain discharge end 72 which is substantially centrally located relative to the longitudinal and transverse dimensions of grain bin 10.

Figure 2:
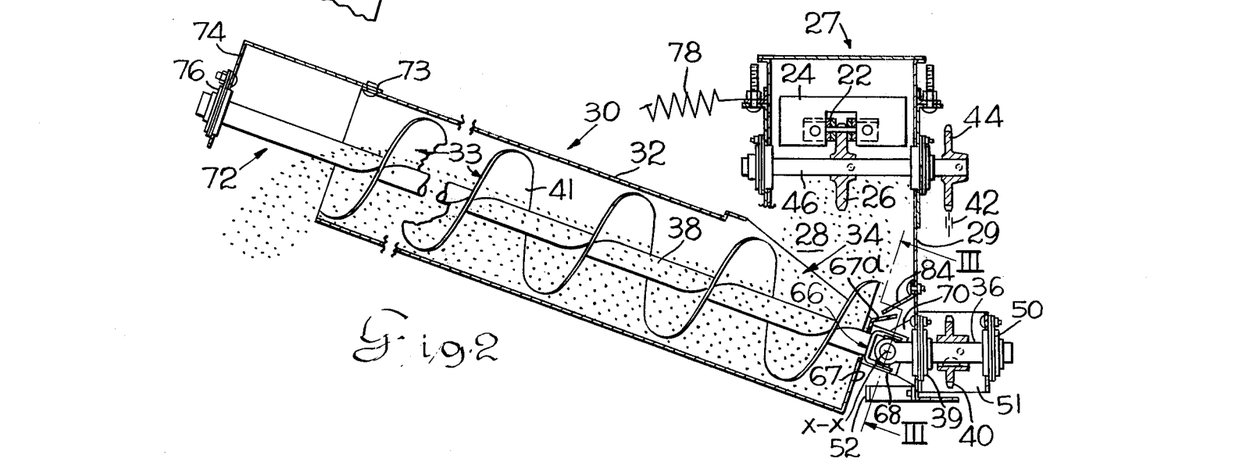
FIG. 2 is a view taken substantially along the section line II—II of FIG. 1.
Figure 5:
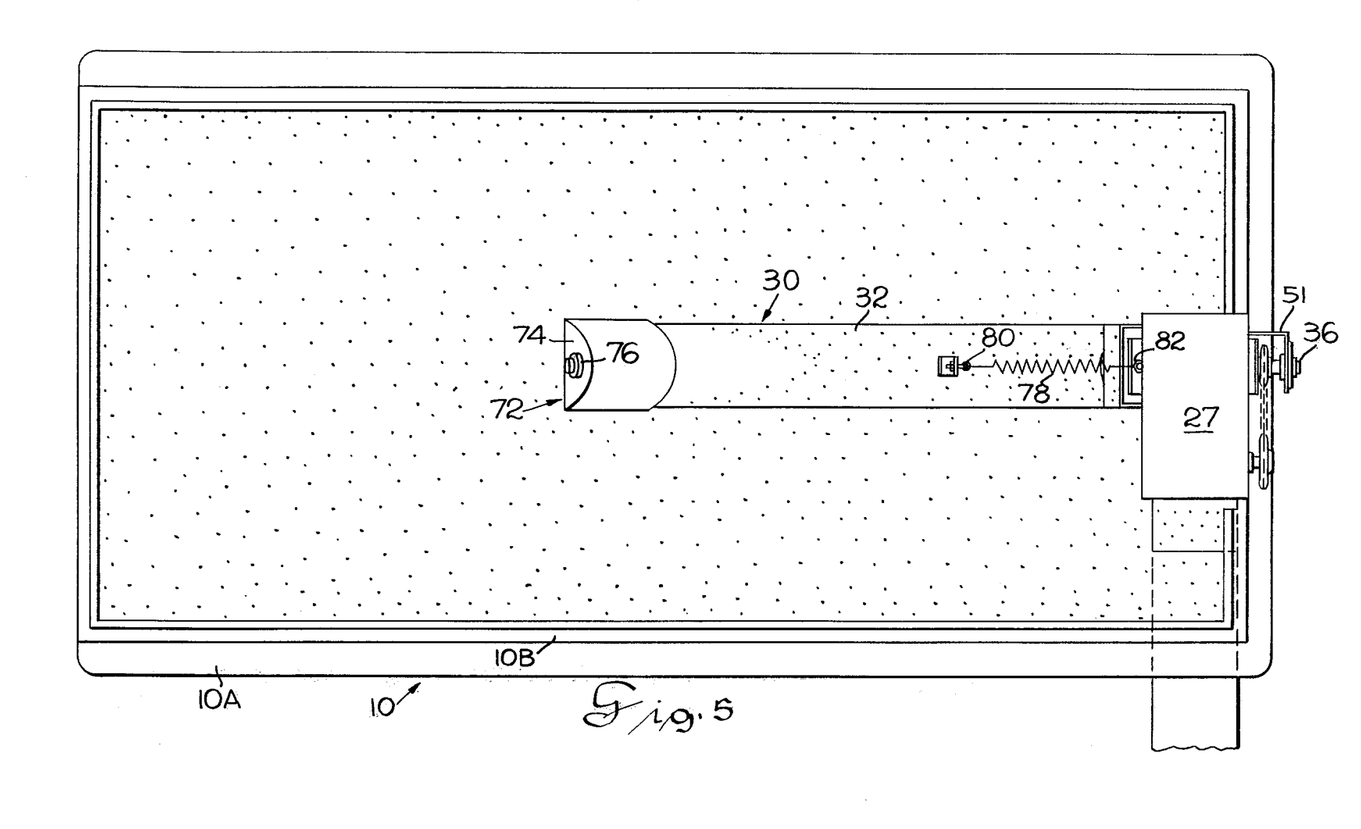
FIG. 5 is a top plan view of the apparatus of FIGS. 1 and 4.

The right-hand end of floating auger tube subassembly 30, relative to the views of FIGS. 2, 4, and 5, extends into the interior of housing 27 and in underlying relation to chute 28, whereby the opening 34 in the upper surface of floating auger tube 32 contiguous the right-hand end of the auger tube is positioned to receive grain discharged from clean grain elevator 14 into chute 28.

The rotatable drive shaft 36 projects laterally beyond the bearing 39 which supports shaft 36 for rotation and into the interior of the lower part of housing 27, where the end of the rotatable drive shaft 36 is connected by a universal connecting means, such as the universal joint, generally indicated at 66, (FIGS. 2 and 4) to rotatable shaft 38 of floating auger tube subassembly 30, whereby rotation of horizontal drive shaft 36 is imparted to shaft 38 of floating auger tube subassembly 30 in any of the various angular positions in a vertical plane which floating auger tube subassembly 30 may be required to assume about horizontal pivotal axis X—X (FIGS. 3 and 3a). The right-hand end wall 67 (FIGS. 2 and 4) of auger tube 32 is suitably apertured to permit passage therethrough of the end rotatable auger shaft 38 which is secured to the universal connecting means 66.

As best seen in FIGS. 3 and 3a, the generally cylindrical-shaped (except for the intake end 34 thereof) floating auger tube 32 is suitably supported for pivotal movement on contiguous stationary structure in such manner that floating auger tube 32 may pivotally move in a vertical plane about horizontal pivotal axis X—X (FIGS. 3 and 3a) which coincides with the pivot point or center P the universal drive connection such as universal joint 66. Thus auger tube 32 and, hence, helical auger conveyor 33 mounted therein, may move in a vertical plane from a horizontal position, such as that indicated at A (FIG. 4) to angularly inclined positions such as B and C (FIG. 4).

More specifically, as best seen in FIGS. 3 and 3a, the radially extending right end wall 67 (FIGS. 2, 4) of pivotally mounted auger tube 32 has a suitably secured thereto one leg 68a of each of a pair of spaced angle members each respectively indicated at 68. The other leg 68b of each angle member 68 is pivotally connected along the horizontal axis X—X to a corresponding one of a pair of bracket arms 70 which are rigidly secured, as by welding, to the inside surface of wall 29 of housing 27. Suitable pivot bolts 71 extend in a horizontal plane along axis X—X through suitable aligned clearance apertures in each angle arm 68b and through its corresponding support bracket arm 70 whereby to permit pivotal movement of auger tube 32 about the horizontal axis X—X which passes through the pivot point or center P of universal drive connection 66.

A discharge end portion generally indicated at 72 (FIGS. 2, 4, 5) is suitably connected as by rivets 73, or the like, to the laterally innermost of left-hand end relative to the views of FIGS. 2, 4, 5 of floating auger tube 32. Discharge end portion 72 is provided at its left-hand end relative to the views of FIGS. 2, 4, 5 with a radially inwardly extending wall portion 74 which supports a bearing 76 in which the inboard (or left-hand end) of rotatable auger shaft 38 is journalled for rotation. End portion 72 of auger tube 32 is provided with a large opening therein at the under portion thereof through which grain which has been propelled through pivotally mounted floating auger tube 32 drops into grain bin 10A or into grain bin extension 10B, depending upon the level of the grain in the bin.

A portion of the weight of floating auger conveyor subassembly 30 may be balanced by a tension spring 78 (FIGS. 2 and 4) which is connected at one end thereof to the upper outer surface of auger tube 32 at a point 80 intermediate the length of floating auger tube 32, with the opposite end of spring 78 being connected at a stationary point 82 contiguous the upper end of housing 27. Spring 78 is so selected that the force of spring 78 alone is not sufficient to raise the floating auger conveyor 30 to an upwardly pivoted position such as that shown at B or C in FIG. 4. However, the force of spring 78 when supplemented by the reaction force of the grain being discharged by the discharge end 72 of floating auger tube 32 against the upper surface of the grain which has accumulated in grain bin 10 will together be sufficient to raise the floating auger tube 32 about its pivotal support axis X—X (FIGS. 3 and 3a) to an elevated position such as one of the positions B or C (FIG. 4).

A significant feature of the construction is the provision of means for directing the flow of grain from the upper end of clean grain elevator 14 via chute 28 to inlet opening 34 of floating auger tube 32 in such manner as to bypass universal joint 66, whereby universal joint 66 is not in the grain flow path. As best seen in FIG. 2, the means for directing the grain flow in a path which bypasses universal joint 66 includes (1) inclined baffle 84 mounted on the inner surface of wall 29 contiguous the lower end of chute 28; and (2) inclined baffle portion 67a formed on right-hand end wall 67 of auger tube 32 above the horizontal center line of end wall 67.

As best seen in FIG. 3, it can be seen that the portion of end wall 67 of auger tube 32 lying above the horizontal axis X—X is bounded by oppositely disposed edges 67b which extend substantially tangentially to the circular periphery of the lower half of end wall 67. The opposite tangential edges 67b are of equal height and are joined by a horizontal edge 67c. Referring to FIG. 3, the opposite tangential edges 67b and the edge 67c bound and define the generally rectangular-shaped area of baffle 67a when this area is bent angularly in a clockwise direction relative to the view of FIG. 2 about the line 67d (FIG. 3) to define the angularly inclined baffle 67a which is in underlying relation to inclined baffle 84 carried by wall 29 at the lower portion of chute 28.

It can be seen that inclined baffle 84 attached to wall 29 of housing 27 is so positioned as to direct into opening 34 of auger tube 32 grain falling through the portion of chute 28 lying above the vicinity of universal joint 66. Furthermore, the inclined baffle portion 67a of end wall 67 of auger tube 32 due to its underlying relation to baffle 84 on end wall 29 further aids in directing grain falling onto baffle 84 toward the grain inlet opening 34 of auger tube 32. Also, due to the underlying relation of both baffles 67a relative to baffle 84, and due to the overlying relation of both baffles 67a and 84 relative to the universal 66, any leakage of grain past the cooperating baffles 67a and 84 is minimized.

The cooperative relation and position of baffles 84 and 67a relative to universal joint 66 as just described causes grain flow from chute 28 to substantially completely bypass universal joint 66 and to pass substantially entirely to inlet opening 34 of auger tube 32. Thus, the baffle construction just described insures that universal joint 66 is not in the path of grain flow from chute 28 to auger tube 32, thereby permitting a higher grain flow rate from chute 28 to auger tube 32, and resulting in less grain damage and lower power consumption as compared to a construction in which the universal joint is in the path of grain flow to auger tube 32.

Operation of the Grain Bin Loading Apparatus

During the grain bin loading operation, as long as the level of the grain in grain bin 10 is lower than the under surface of floating auger tube 32 in the horizontal A position of auger tube 32 (FIG. 4), auger tube 32 will remain in the horizontal position and will discharge grain into bin 10 while in the horizontal or A position.

Clean grain is received by the lower end of the clean grain elevator generally indicated at 14 and is elevated by flights 24 of the endless conveyor to the upper end of the grain elevator where the clean grain is discharged into the vertical chute 28 which delivers the clean grain through the open upper end 34 of the pivotally mounted auger tube 32 into the interior of auger tube 32.

Inclined baffle 84 fixed to wall 29 contiguous the lower end of chute 28 cooperates with baffle 67a carried by end wall 67 of auger tube 32 to direct grain from chute 28 into grain inlet opening 34 of auger tube 32 and to prevent grain from chute 28 falling into universal drive joint 66 which connects rotatable drive shaft 36 to rotatable auger shaft 38.

Rotatable drive shaft 36 is rotatably driven from sprocket 44 on idler shaft 46 at the upper end of the clean grain elevator 14, through chain 42 and sprocket 40 on the laterally outer end of drive shaft 36. The left-hand end of drive shaft 36 relative to the views of FIGS. 2 and 4 is connected by universal drive joint 66 to rotatable auger shaft 38 in floating auger tube 32. Floating auger tube 32 is pivotally mounted relative to fixed support brackets 70 carried by wall 29 for pivotal movement about a pivotal axis X—X which passes through the pivot joint or center P (FIGS. 3 and 3a) of universal drive joint 66, whereby floating auger shaft 38 and floating auger tube 32 which housing shaft 38 both pivot in a vertical plane about the horizontal pivotal axis X—X. Rotation of horizontal drive shaft 36 imparts rotation through universal drive joint 66 to auger shaft 38 in floating auger tube 32, whereby to rotatably drive helical grain conveyor auger 41 which is fixed to and rotatable with rotatable auger shaft 38 of the floating auger conveyor generally indicated at 30.

The grain which has entered floating auger tube 32 from chute 28 through grain inlet opening 34 of auger tube 32 is propelled toward discharge end 72 of auger tube 32 by rotating helical auger conveyor 41.

When the level of grain in main grain bin 10A reaches a predetermined level, wherein the grain level in the bin rises substantially to the level of the discharge opening 72, such as a level substantially that of the under surface of floating auger tube 32 in its horizontal or A position (FIG. 4), the reaction force of the grain being discharged through discharge end 72 of auger tube 32 against the upper surface of the accumulated grain in main grain bin 10A will impart an upward thrust force to pivotally mounted auger tube 32, tending to cause floating auger tube 32 to swing upwardly about its pivotal connection about horizontal axis X—X. As the grain continues to pile up above the level of the upper edge of main grain bin 10A and extends into grain bin extension 10B mounted above and in grain flow communication with main grain bin 10A, floating auger tube 32 will pivotally move about its pivotal support to assume positions such as those indicated at B and C in FIG. 4.

As the level of the grain exceeds the level of the under surface of floating auger tube 32 in its horizontal or A (FIG. 4) position, the under surface of at least the discharge end of floating auger tube 32 will always rest substantially on the upper surface of the accumulated grain in main grain bin 10A or grain bin extension 10B, as the case may be, and floating auger tube 32 will continue to swing upwardly about its pivotal axis X—X (FIG. 3) as the level of the grain continues to rise in grain bin extension 10B to the heaped condition shown in FIG. 4 wherein the free end of auger tube 32 is disposed above the height of bin 10 and elevator housing 27. This upward movement of floating auger tube 32 as previously mentioned is due, in the illustrated embodiment, to the combined action of (1) the reaction force of the grain being discharged by the discharge end 72 of floating auger tube 32 against the upper surface of the accumulated grain in the grain bin; and (2) the tension force of spring 78 which of itself is not enough to move the pivotally mounted auger tube 32 upwardly about its pivotal support but which when combined with the reaction force of the discharging grain against the upper surface of the already loaded grain effectuates the upward pivotal movement of floating auger tube 32. In some constructions and/or under certain operating conditions, the use of tension spring 78 may not be required to effectuate the upward pivotal movement of floating auger tube 32.

When the grain bin is emptied, the pivotally mounted floating auger tube 32 will pivotally move in a downward direction until it again reaches the horizontal limiting position indicated at A in FIG. 4.

While the driving connection between horizontal rotatable drive shaft 36 and the floating rotatable shaft 38 of auger conveyor 30 has been illustrated and described as being a universal joint, other types of flexible joints could be used for effecting a rotatable driving connection between shaft 36 and shaft 38.

It can be seen that the floating bin loading auger conveyor of the invention has the advantage that the grain is delivered directly from grain chute 28 to grain inlet opening 34 of floating auger tube 32, the grain flow in the region of chute 28 which overlies universal joint 66 being directed to opening 34 of auger tube 32 by baffles 84 and 67a which substantially prevent any grain from chute 28 falling onto universal joint 66. Thus, in the construction hereinbefore described the universal joint 66 is not in the path of grain flow from chute 28 to auger tube 32. This construction permits a higher grain flow rate, causes less grain damage, and consumes less power than a construction in which the universal joint is in the flow path of the grain from the chute to the auger conveyor.

From the foregoing detailed description of the invention, it has been shown how the objects of the invention have been obtained in a preferred manner. However, modifications and equivalents of the disclosed concepts such as readily occur to those skilled in the art are intended to be included within the scope of this invention.

The embodiments of the invention in which an exclusive property of priviledge is claimed are defined as follows:

1. In combination, a grain storage tank means adapted to be mounted on an agricultural combine, an elevating conveyor adapted to deliver grain to an upper portion of said storage tank means, a grain conveyor positioned contiguous but beneath the upper end of said storage tank means, said grain conveyor being adapted to receive grain discharged by said elevating conveyor and to convey grain thus received to a substantially downwardly directed discharge outlet of said grain conveyor in overlying relation to the interior of said storage tank means, said grain conveyor being adapted to be connected to a drive means including a universal connecting means whereby said grain conveyor remains connected in driven relation to said drive means at changing angular positions of said grain conveyor relative to the horizontal plane, support means supporting said grain conveyor for pivotal movement about a horizontal axis coincident with the center of said universal connecting means whereby at least the discharge end of said grain conveyor rides on the upper surface of the loaded grain in said storage tank means when the level of grain in said storage tank means exceeds a predetermined level, and means defining a path excluding said universal connecting means for passage of grain from contiguous the upper end of said elevating conveyor to the intake of said grain conveyor.

2. The combination defined in claim 1 including baffle means extending into said path for directing grain in said path in a direction toward said intake of said grain conveyor and away from said universal connecting means.

3. The combination defined in claim 2 in which said path for passage of grain includes a chute extending from contiguous the upper end of said elevating conveyor and toward the input end of said grain conveyor, said baffle means including a first baffle member extending into said path from a bounding wall of said chute, said baffle means including a second baffle member carried by said conveyor means and adapted to underlie said first baffle member, both said first and said second baffle members being in substantially overlying relation to said universal means in the various pivotal positions of said conveyor means, whereby to prevent leakage of grain from said path onto said universal connecting means.

4. The combination defined in claim 1 in which the reaction of the grain being discharged from said grain conveyor against the upper surface of the already loaded grain in said storage tank means provides a reaction force urging said grain conveyor to swing upwardly about its horizontal pivotal axis whereby to cause at least the discharage end of said grain conveyor to ride on said upper surface of the already loaded grain.

5. The combination defined in claim 4 which additionally comprises a spring means which supplements said reaction force to assist at least the discharge end of said grain conveyor to ride on said upper surface of the loaded grain.

6. The combination defined in claim 1 in which said grain conveyor comprises an auger tube and a conveyor auger mounted for rotation in said auger tube, said conveyor auger being rotatably drivingly connected to said drive means through said universal connecting means, and said auger tube being pivotally connected to said support means for pivotal movement about a horizontal axis coincident with the center of said universal connecting means, whereby at least the discharge end of said auger tube rides on said upper surface of the loaded grain in said storage tank means when the level of the grain in said storage tank means exceeds a predetermined level.

7. A grain loading apparatus for use with a grain storage tank mens carried by an agricultural combine, said grain loading apparatus comprising a grain conveyor positioned contiguous but beneath the upper end of said storage tank means, said grain conveyor being adapted to receive grain discharge by an elevating conveyor and to convey grain thus received to a substantially downwardly directed discharge outlet of said grain conveyor in overlying relation to the interior of said storage tank means, said grain conveyor being adapted to be connected to a drive means including a universal connecting means whereby said grain conveyor remains connected to driven relation to said drive means at changing angular positions of said grain conveyor relative to the horizontal plane, support means supporting said grain conveyor for pivotal movement about a horizontal axis coincident with the center of said universal connecting means, whereby at least the discharge end of said grain conveyor rides on the upper surface of the already loaded grain in said storage tank means when the level of grain in said storage tank means exceeds a predetermined level, and means defining a path excluding said universal connecting means for passage of grain from contiguous the upper end of said elevating conveyor to the intake of said grain conveyor.

8. The combination defined in claim 7 including baffle means extending into said path for directing grain in said path in a direction toward said intake of said grain conveyor and away from said universal connecting means.

9. The combination defined in claim 7 in which said path for passage of grain includes a chute extending from contiguous the upper end of said elevating conveyor and toward the intake of said grain conveyor, said baffle means including a first baffle member extending into said path from a bounding wall of said chute, a second baffle member carried by said conveyor means and adapted to underlie said first baffle member, both said first and second baffle members being in substantially overlying relation to said universal connecting means in the various pivotal positions of said conveyor means, whereby to prevent leakage of grain from said path onto said universal connecting means.

10. The combination defined in claim 7 in which the reaction of the grain being discarged from said grain conveyor against the upper surface of the already loaded grain in said storage tank means provides a reaction force urging said grain to swing upwardly about its horizontal pivotal axis whereby to cause at least the discharge end of said grain conveyor to ride on said upper surface of the already loaded grain.

11. The combination defined in claim 10 which additionally comprises a spring means which supplements said reaction force to assist at least the discharge end of said grain conveyor to float on said upper surface of the already loaded grain.

12. The combination defined in claim 7 in which said grain conveyor comprises an auger tube and a conveyor auger mounted for rotation in said auger tube, said conveyor auger being rotatably drivingly connected to said drive means through said universal connecting means, and said auger tube being pivotally connected to said support means for pivotal movement about a horizontal axis coincident with the center of said universal connecting means, whereby at least the discharge end of said auger tube rides on said upper surface of the loaded grain in said storage tank means when the level of the grain in said storage tank means exceeds a predetermined level.

* * * * *

UNITED STATES PATENT OFFICE
CERTIFICATE OF CORRECTION

Patent No. 4,008,819  Dated February 22, 1977

Inventor(s) Roger D. Hanaway

It is certified that error appears in the above-identified patent and that said Letters Patent are hereby corrected as shown below:

The Abstract appearing on the cover sheet should be corrected to read as follows:  Line 16, "joint as" should read --- joint. As --- ;  Column 10, line 23, after "universal" --- connecting --- should be inserted;  line 33, "discharage" should read --- discharge --- ;  line 55, "mens" should read --- means --- ;  line 66, "to" (first occurrence) should read --- in --- .  Column 12, line 4, "discarged" should read --- discharged --- ;  line 7, after "grain" --- conveyor --- should be inserted.

Signed and Sealed this

Sixth Day of September 1977

[SEAL]

Attest:

RUTH C. MASON  
Attesting Officer

LUTRELLE F. PARKER  
Acting Commissioner of Patents and Trademarks